(12) United States Patent
Watanabe et al.

(10) Patent No.: US 10,279,713 B2
(45) Date of Patent: May 7, 2019

(54) VEHICLE SEAT

(71) Applicant: TOYOTA BOSHOKU KABUSHIKI KAISHA, Aichi-ken (JP)

(72) Inventors: Toyotaka Watanabe, Gifu (JP); Atsushi Nagaya, Aichi (JP); Motohiro Fukuta, Aichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/792,316

(22) Filed: Oct. 24, 2017

(65) Prior Publication Data
US 2018/0118059 A1 May 3, 2018

(30) Foreign Application Priority Data
Oct. 31, 2016 (JP) .................. 2016-212922

(51) Int. Cl.
*B60N 2/58* (2006.01)
*A47C 7/62* (2006.01)
*B60N 2/36* (2006.01)

(52) U.S. Cl.
CPC .......... *B60N 2/36* (2013.01); *B60N 2002/363* (2013.01)

(58) Field of Classification Search
CPC ........................... B60N 2/36; B60N 2002/363
USPC ............... 297/15, 182, 463.1, 463.2
See application file for complete search history.

(56) References Cited

U.S. PATENT DOCUMENTS 3,011,822 A * 12/1961 May .................. B60N 2/20
296/66
4,848,826 A * 7/1989 Kuwabara ............ B60N 2/3009
296/97.23
4,979,772 A * 12/1990 Carey .................. B60N 2/3011
296/39.1
5,011,210 A * 4/1991 Inoue ...................... B60N 2/36
296/37.16
5,322,335 A * 6/1994 Niemi .................. B60N 2/6009
296/39.1
5,362,131 A * 11/1994 Susko ...................... B60N 2/58
297/463.1

(Continued)

FOREIGN PATENT DOCUMENTS

| DE | 29921499 U1 | 5/2001 |
| JP | 58-039535 A | 3/1983 |
| JP | 2013-209002 | 10/2013 |

OTHER PUBLICATIONS

German Office Action in counterpart application No. DE102017218985.1, dated Oct. 5, 2018 (with partial English-language translation).

*Primary Examiner* — Rodney B White

(74) *Attorney, Agent, or Firm* — Greenblum & Bernstein, P.L.C.

(57) ABSTRACT

A vehicle seat includes a seat cushion; a seatback configured to be tiltable in a front-rear direction; a deck board positioned behind the seatback; a covering having flexibility and provided to extend from the seatback to the deck board; and an object drop preventing material that covers, from a back side, a gap between the seatback and the seat cushion. The object drop preventing material is provided to extend from the seat cushion to an intermediate part of the covering in a length direction of the extending covering such that the object drop preventing material restricts an amount of upward bending of the covering.

3 Claims, 4 Drawing Sheets

(56) References Cited

U.S. PATENT DOCUMENTS

| | | | | |
|---|---|---|---|---|
| 5,658,046 | A * | 8/1997 | Rus | B60N 2/3013 16/4 |
| 5,702,145 | A * | 12/1997 | Fowler | B60N 2/3013 296/65.05 |
| 5,795,023 | A * | 8/1998 | Kayumi | B60N 2/3013 297/331 |
| 6,394,542 | B2 * | 5/2002 | Potisch | A47C 7/40 297/182 |
| 6,623,061 | B2 * | 9/2003 | Tourangeau | B60N 2/3013 296/63 |
| 6,648,395 | B2 * | 11/2003 | Hoshino | B60N 2/206 296/66 |
| 6,746,083 | B2 * | 6/2004 | Drew | B60N 2/206 296/65.05 |
| 6,817,660 | B2 * | 11/2004 | Ito | B60N 2/3013 296/65.09 |
| 7,159,922 | B2 * | 1/2007 | Iyoda | B60N 2/3031 296/66 |
| 7,396,075 | B2 * | 7/2008 | Ohkuma | B60K 1/04 296/65.05 |
| 8,398,164 | B2 * | 3/2013 | Baker | B60N 2/3011 297/15 |
| 8,439,419 | B2 * | 5/2013 | Zuelch | B60N 2/36 296/65.16 |
| 8,505,999 | B2 * | 8/2013 | Whalen | B60N 2/3013 296/65.09 |
| 8,550,549 | B2 * | 10/2013 | Baker | B60N 2/3011 296/66 |
| 9,457,724 | B2 * | 10/2016 | Lu | B60R 5/045 |
| 9,539,917 | B2 * | 1/2017 | Toyama | B60N 2/36 |
| 9,981,579 | B2 * | 5/2018 | Watanabe | B60N 2/22 |
| 2001/0015571 | A1 | 8/2001 | Potisch et al. | |

* cited by examiner

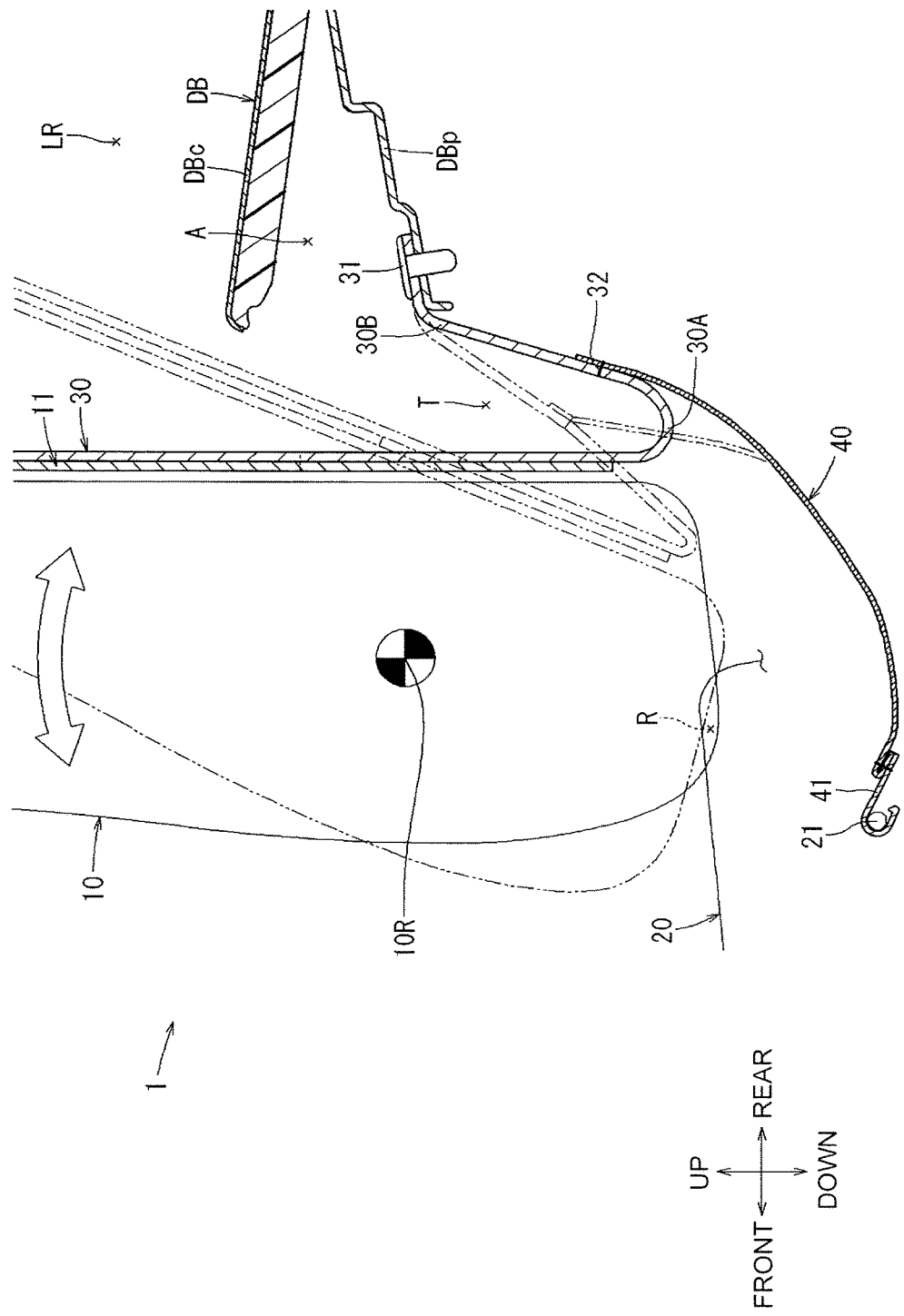

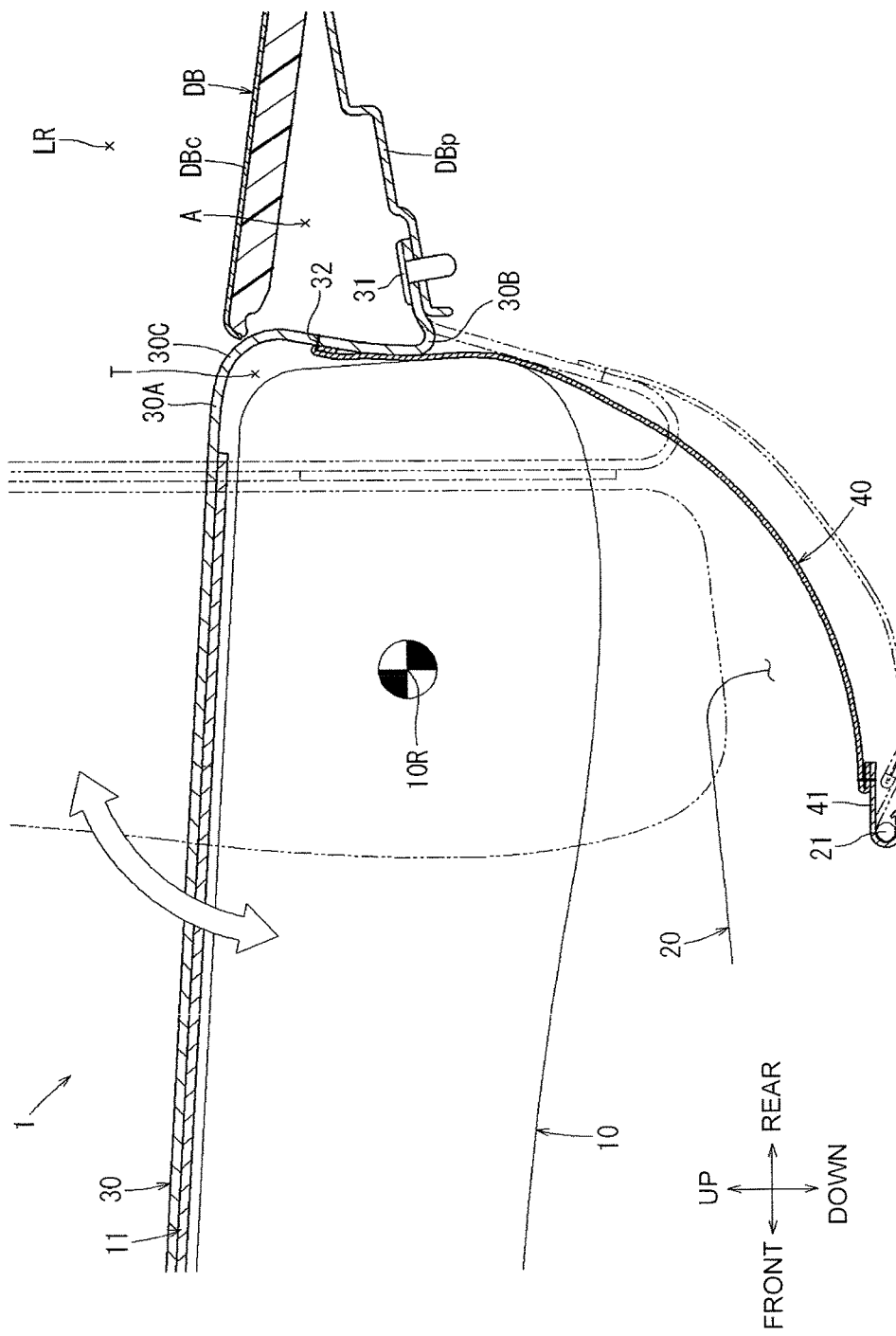

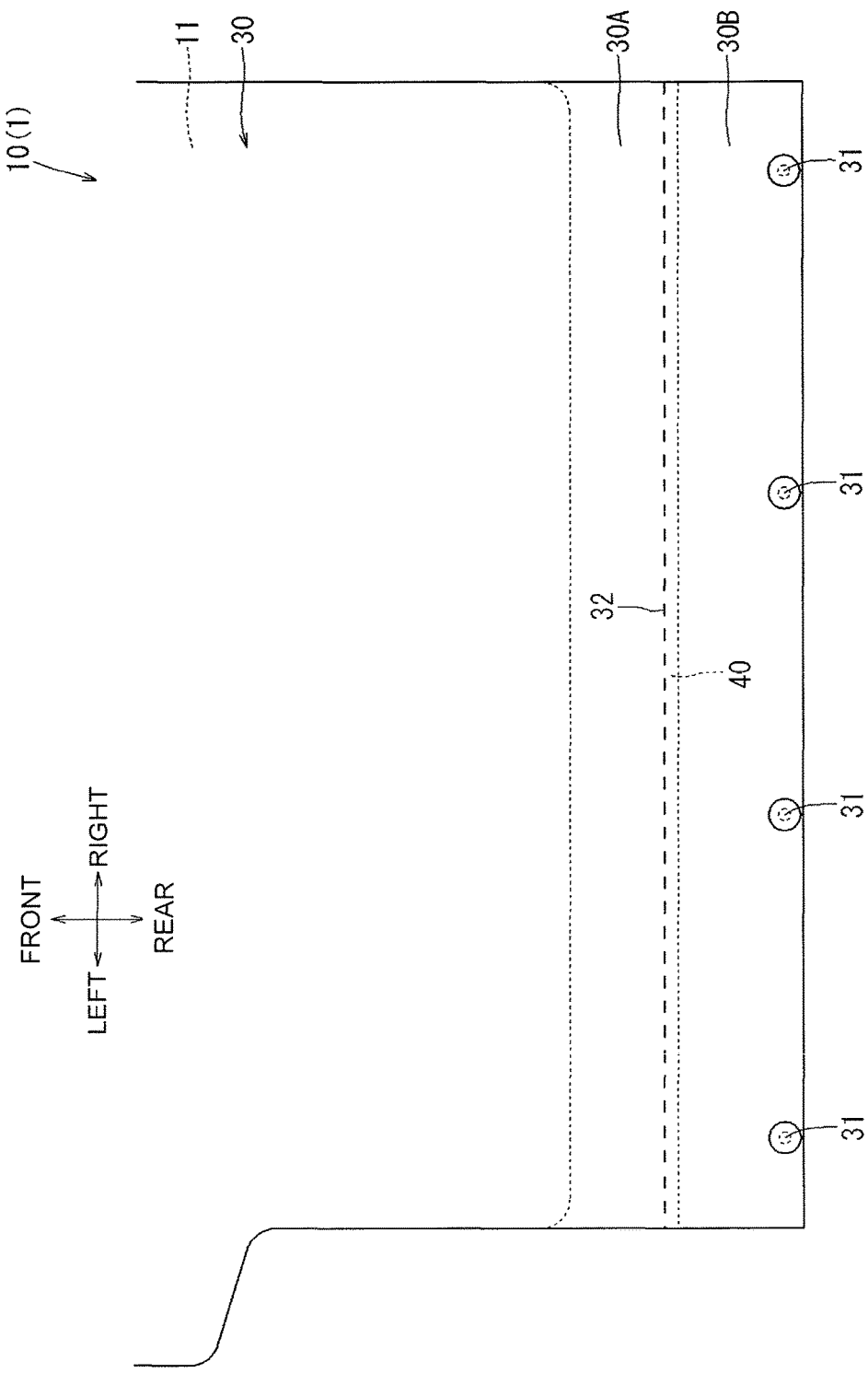

VEHICLE SEAT

INCORPORATION BY REFERENCE

The disclosure of Japanese Patent Application No. 2016-212922 filed on Oct. 31, 2016 including the specification, drawings and abstract is incorporated herein by reference in its entirety.

BACKGROUND

1. Technical Field

The disclosure relates to a vehicle seat. More specifically, the disclosure relates to a vehicle seat configured such that a covering having flexibility is provided to extend from a seatback to a deck board positioned behind the seatback.

2. Description of Related Art

There has been known a rear seat for a vehicle, in which a carpet is provided to extend from a back-side part of a seatback to a deck board of a luggage compartment behind the seatback, so as to cover a gap between the seatback and the deck board (Japanese Patent Application Publication No. 2013-209002 (JP 2013-209002 A)). When the seatback is in a standing state such that the seatback is used as a backrest, the carpet is positioned inside the gap between the seatback and the deck board in a state where the carpet hangs down in a slack manner. Further, when the seatback is tilted forward, the carpet is drawn to a front side so as to follow the seatback due to the movement of the seatback, and thus, the carpet is stretched between the seatback and the deck board.

SUMMARY

In the related art, the carpet is folded in a valley shape and portions of the carpet are sewn together in advance to maintain the valley shape so that the carpet easily hangs down at the time when the seatback is in the standing state. However, although the portions of the carpet are sewn together to maintain the valley shape, a downward pulling force is not applied to the carpet. Therefore, the carpet may be pushed to protrude in a mountain shape by some chance at the time when the seatback is raised up. If a member for applying a downward pulling force to the carpet is additionally provided, the number of components and the cost are increased.

The disclosure makes it possible to restrain a covering from protruding upward by a prescribed amount or more, with the use of a rational configuration, the covering being provided to extend from a movable seatback to a deck board.

An aspect of the disclosure relates to a vehicle seat including a seat cushion; a seatback configured to be tiltable in a front-rear direction; a deck board positioned behind the seatback; a covering having flexibility and provided to extend from the seatback to the deck board; and an object drop preventing material that covers, from a back side, a gap between the seatback and the seat cushion. The object drop preventing material is provided to extend from the seat cushion to an intermediate part of the covering in a length direction of the extending covering such that the object drop preventing material restricts an amount of upward bending of the covering.

According to the above aspect, at the time when the covering is bent due to the tilting of the seatback, even if the covering is to be bent so as to protrude upward relative to the deck board by some chance, the movement is restrained by the object drop preventing material provided to extend from the seat cushion to the intermediate part of the covering. Thus, with the use of the configuration of the object drop preventing material that covers the gap between the seatback and the seat cushion, it is possible to appropriately restrain the covering from protruding upward by a prescribed amount or more.

In the above aspect, the object drop preventing material may include a flexible planar member.

With this configuration, the movement of the covering that bends along with the movement of the seatback is hardly obstructed by the object drop preventing material. Further, even if the object drop preventing material bends along with the movement of the covering, the object drop preventing material is hardly twisted laterally and the orientation of the object drop preventing material is hardly changed. Thus, both the object drop preventing material and the covering can function appropriately.

In the above aspect, the covering and the object drop preventing material may be connected to each other so as to form a continuous planar shape.

With this configuration, an effect of restraining upward protruding of the covering can be obtained appropriately over a wide area in the width direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a sectional view taken along a line II-II in FIG. 1;

FIG. 3 is a sectional view illustrating a state where a seatback is tilted forward from FIG. 2; and FIG. 4 is a back view of a carpet.

DETAILED DESCRIPTION OF EMBODIMENTS

Figure 1:
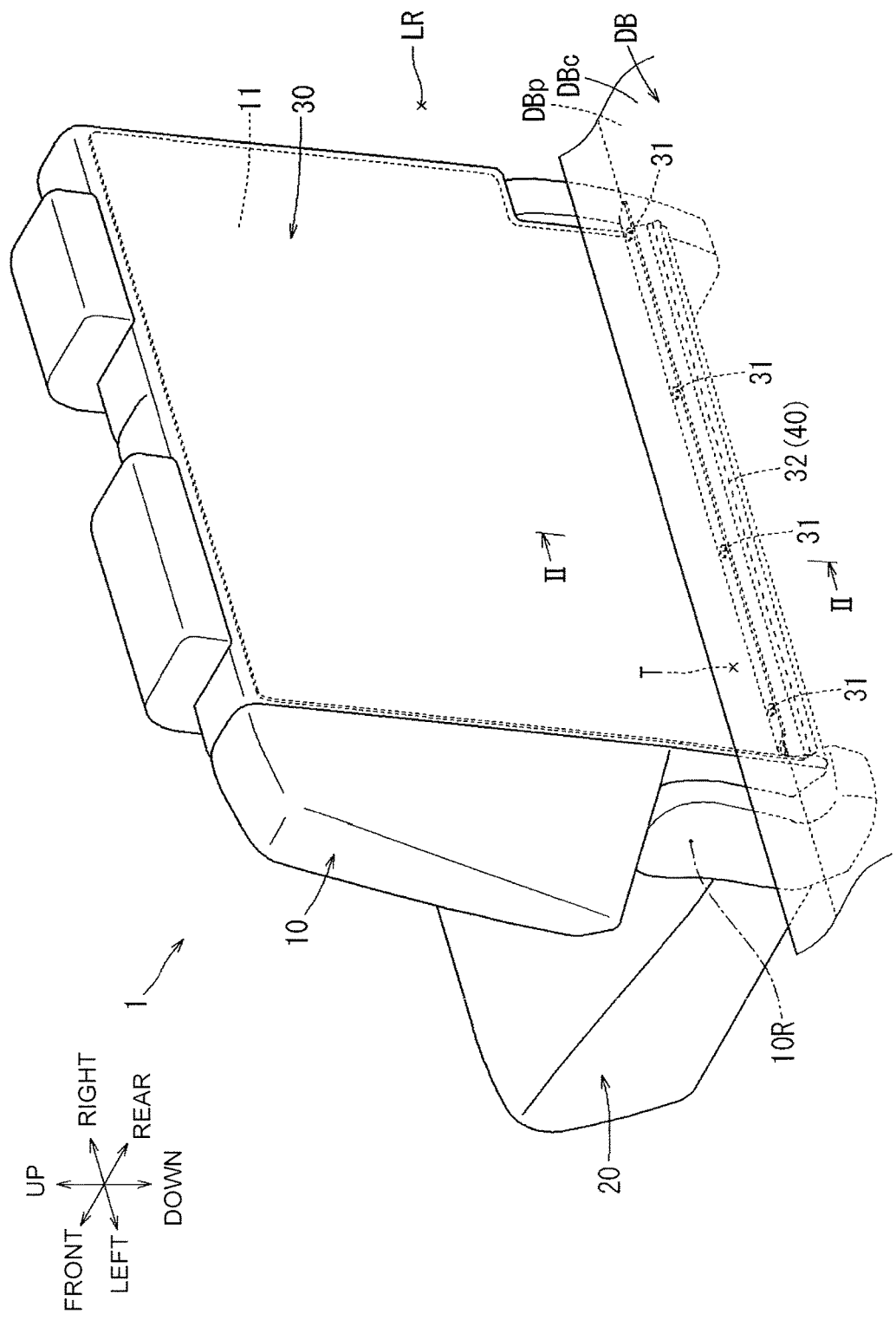
FIG. 1 is a perspective view illustrating a schematic configuration of a vehicle seat according to a first embodiment.

Hereinafter, example embodiments of the disclosure will be described with reference to the drawings.

First, the configuration of a seat 1 according to a first embodiment will be described with reference to FIGS. 1 to 4. The seat 1 according to the present embodiment is configured as a rear seat of a vehicle (an automobile) as illustrated in FIGS. 1 to 2. A luggage compartment LR at a back part of the vehicle is formed in a region behind the seat 1. The seat 1 includes a seatback 10 serving as a backrest for a seated occupant, and a seat cushion 20 serving as a seat portion. The seatback 10 is configured such that lower ends of right and left sides thereof are connected to rear ends of right and left sides of the seat cushion 20 via recliners (not shown). As illustrated in FIG. 2, the backrest angle of the seatback 10 can be adjusted (i.e., the seatback 10 is tiltable) in a front-rear direction around rotational centers 10R of the recliners (not shown), and the seatback 10 can be fixed at each adjusted position.

Further, since the backrest angle is changeable, the seatback 10 can be tilted forward from a standing posture position where the seatback 10 is used as a backrest as illustrated in FIG. 2, to a laid posture position where the seatback 10 is laid above a top surface portion of the seat cushion 20 as illustrated in FIG. 3. The seatback 10 can be tilted forward only to a position where the seatback 10 is laid above the seat cushion 20 so as to be slightly inclined upward in a direction toward the front side, due to an interference between a cushion structure inside the seatback 10 and a cushion structure inside the seat cushion 20.

Thus, a deck board DB is made substantially of resin and forms a floor surface of the luggage compartment LR. The deck board DB is also formed to be slightly inclined upward in the direction toward the front side, such that the deck board DB and the back surface of the seatback 10 form a substantially flush floor surface when the seatback 10 is laid above the seat cushion 20 so as to be slightly inclined upward in the direction toward the front side. Thus, due to the forward-tilting rotation of the seatback 10, the back surface of the seatback 10 and the top surface of the deck board DB form the substantially flush floor surface without any step therebetween. Thus, the substantially flush floor surface is expanded.

As illustrated in FIGS. 2 to 3, a gap T is set between the seatback 10 and the deck board DB, so as to avoid an interference between the seatback 10 and the deck board DB at the time when the backrest angle of the seatback 10 is adjusted or when the seatback 10 is tilted forward. The gap T is formed in a valley shape recessed in a stepped manner between the seatback 10 and the deck board DB. Accordingly, this gap T ends up creating a break in the floor surface formed by the seatback 10 and the deck board DB when the seatback 10 is laid forward. Therefore, a carpet 30 is provided between the seatback 10 and the deck board DB. The carpet 30 is disposed to extend from the seatback 10 to the deck board DB, and thus, the carpet 30 functions to eliminate the break in the floor surface. Here, the carpet 30 may be regarded as the "covering" of the disclosure.

The carpet 30 is a single sheet of flexible planar material cut in a substantially rectangular shape, the planar material being the same material as a carpet material DBc covering the deck board DB. A front part of the carpet 30 is attached to the seatback 10. More specifically, a surface of the front part of the carpet 30 is bonded to a back surface of a backboard 11 made of resin (i.e., the front part of the carpet 30 is surface-bonded to the backboard 11), and thus, the front part of the carpet 30 overlaps with the back surface of the backboard 11. The backboard 11 is attached to the back-side part of the seatback 10.

When the seatback 10 is tilted forward such that the back surface of the seatback 10 and the top surface of the deck board DB form the substantially flush floor surface, the carpet 30 protruding in a flush manner from the back surface of the seatback 10 approaches the carpet material DBc covering the top surface of the deck board DB. Thus, the carpet 30 forms a design surface with a good external appearance, which is continuous with the carpet material DBc. Further, when the seatback 10 is tilted forward such that its back surface is used as the floor surface of the luggage compartment LR, the back surface of the seatback 10 can exhibit a high structural strength, similarly to the deck board DB, due to the hard backboard 11 covered with the carpet 30.

A rear part of the carpet 30 is attached to the deck board DB. The rear part of the carpet 30 is set such that the rear part contacts a deck panel DBp, and four parts thereof in its vehicle width direction (a width direction) are fastened integrally to the deck panel DBp with fixing pins 31. Thus, the rear part of the carpet 30 is fixed to the deck panel DBp. The deck panel DBp is included in the deck board DB, and is positioned in a location under a front end part of the deck board DB. The deck panel DBp is positioned with a space A provided between the deck panel DBp and the front end part of the deck board DB in a height direction. The space A makes it possible to easily perform an operation of setting and fixing the carpet 30 on the deck panel DBp.

As illustrated in FIG. 2, a part 30A of the carpet 30 exerts an elastic restoring force in a direction such that the part 30A is flush with the backboard 11 due to support stiffness of a part that is surface-bonded onto the backboard 11, the part 30A extending from the back surface of the backboard 11 of the seatback 10. Further, similarly, a part 30B of the carpet 30 exerts an elastic restoring force in a direction such that the part 30B is flush with the deck panel DBp due to support stiffness of a part fastened onto the deck panel DBp, the part 30B extending from the deck panel DBp.

When the seatback 10 is in the standing state such that the seatback 10 is used as the backrest, a bottom end of the backboard 11 is located at a position lower than a front end of the deck panel DBp. Accordingly, the carpet 30 is bent in a V-shape (a valley shape) between the backboard 11 and the deck panel DBp due to the action of the elastic restoring forces. Further, as illustrated in FIG. 3, when the seatback 10 is tilted forward above the top surface portion of the seat cushion 20, the bottom end of the backboard 11 (a rear end at the time of forward tilting) is located at a position higher than the front end of the deck panel DBp, and thus, the carpet 30 is bent in a reverse S-shape described below.

That is, due to an action of an elastic force of the part 30A extending from the back surface of the backboard 11 and an action of an elastic force of the part 30B extending from the deck panel DBp, the carpet 30 is bent in a reverse S-shape (a crank-fold shape) between the backboard 11 and the deck panel DBp. Since the carpet 30 is thus bent in a reverse S-shape, the part 30A extending rearward from the backboard 11 becomes substantially flush with the backboard 11 and comes closer to the carpet material DBc disposed on the deck board DB at the time when the seatback 10 is tilted forward. Then, the extending part 30A of the carpet 30 is drawn in a shape that curves downward at a position slightly ahead of a position where the part 30A interferes with the deck board DB (i.e., a curved portion 30C is formed), due to the action of the elastic force of the part 30B extending forward from the deck panel DBp.

However, in a case where the carpet 30 has wrinkles (creases) in the vicinity of a part fastened to the deck panel DBp due to longtime use or the carpet 30 is caught by a constituent component (not shown) in the seatback 10 due to an interference with the constituent component at the time when the seatback 10 is tilted forward, the part 30A extending rearward from the backboard 11 may receive a force for pushing the part 30A beyond a height position where the part 30A becomes flush with the backboard 11 such that the part 30A protrudes upward in a mountain shape at the time when the seatback 10 is tilted forward. When the carpet 30 is bent to protrude upward due to the force, for example, the external appearance may be worsened and usability of the carpet 30 as the floor surface may be decreased.

In view of this, the carpet 30 is provided with an object drop preventing material 40. The object drop preventing material 40 is flexible, and has a planar shape. The object drop preventing material 40 is configured to restrict an amount of upward bending of the extending part 30A within a prescribed range such that the part 30A extending rearward from the back surface of the backboard 11 is not bent to protrude upward at the time when the seatback 10 is tilted forward or raised up. The object drop preventing material 40 is provided to extend from the carpet 30 to the seat cushion 20. The object drop preventing material 40 is made of a non-woven fabric thinner than the carpet 30. The object drop preventing material 40 is provided to extend from a back surface of the part 30B of the carpet 30 to a wire 21 provided in a rear lower portion of the seat cushion 20, the part 30B extending from the deck panel DBp.

More specifically, the object drop preventing material 40 is cut in a substantially rectangular shape having substantially the same width as that of the carpet 30. A rear edge of the object drop preventing material 40 is sewn to the back surface of the part 30B of the carpet 30, which extends from the deck panel DBp, such that a straight sewing line extends in the width direction (a sewn portion 32, see FIG. 4). A front edge of the object drop preventing material 40 is fixed to the rear lower portion of the seat cushion 20, by hooking a hook 41 provided along the edge, on the wire 21 (see FIGS. 2 to 3). The wire 21 is provided in the rear lower portion of the seat cushion 20 and extends in the width direction.

The object drop preventing material 40 provided as described above covers a gap R between the seatback 10 and the seat cushion 20 from the back side. The object drop preventing material 40 has a planar shape having a wide width. When a small object drops through the gap R, the object drop preventing material 40 functions to catch the small object so as to prevent the small object from dropping to the floor. The object drop preventing material 40 is sewn to the part 30B of the carpet 30, which extends from the deck panel DBp (the sewn portion 32). Accordingly, as illustrated in FIG. 2, when the seatback 10 is in the standing state such that the seatback 10 is used as the backrest, the sewn portion 32 is located in a part extending upward toward the rear side from a valley bottom of the carpet 30 bent in a valley shape. With the configuration, at the time when the valley shape of the carpet 30 is viewed from above, the sewn portion 32 is located at a position where the sewn portion 32 is hardly viewed, and thus, the appearance of the inside of the gap T is not worsened.

As illustrated in FIG. 3, along with an upward displacement of the carpet 30 as the seatback 10 is tilted forward, the object drop preventing material 40 is slightly stretched with its front edge serving as a supporting point, the front edge being fixed to the rear lower portion of the seat cushion 20. Thus, the object drop preventing material 40 applies a restraining force to the extending part 30B of the carpet 30, to which the object drop preventing material 40 is sewn, so that the extending part 30B does not bend further upward. Due to the action, the carpet 30 is maintained in a state where the bending, in an upward protruding direction, of the part 30A of the carpet 30 is restrained, the part 30A extending rearward from the back surface of the backboard 11.

When the above description is summarized, the seat 1 of the present embodiment has the following configuration. That is, the seat 1 is a vehicle seat configured such that a covering (the carpet 30) having flexibility is provided to extend from a seatback (the seatback 10) to a deck board (the deck board DB) positioned behind the seatback. The seatback (the seatback 10) is configured to be tiltable in a front-rear direction. An object drop preventing material (the object drop preventing material 40) covers, from a back side, a gap (the gap R) between the seatback (the seatback 10) and a seat cushion (the seat cushion 20). The object drop preventing material (the object drop preventing material 40) is provided to extend from the seat cushion (the seat cushion 20) to an intermediate part (the extending part 30B) of the covering (the carpet 30) in a length direction of the extending covering (the carpet 30) (i.e., a length direction in which the covering extends) such that the object drop preventing material (the object drop preventing material 40) restricts an amount of upward bending of the covering (the carpet 30).

With the configuration, at the time when the covering (the carpet 30) is bent due to the tilting of the seatback (seatback 10), even if the covering (the carpet 30) is to be bent so as to protrude upward relative to the deck board (the deck board DB) by some chance, the movement is restrained by the object drop preventing material (the object drop preventing material 40) provided to extend from the seat cushion (the seat cushion 20) to the intermediate part (the extending part 30B). Thus, with the use of the configuration of the object drop preventing material (the object drop preventing material 40) covering the gap (the gap R) between the seatback (the seatback 10) and the seat cushion (the seat cushion 20), it is possible to appropriately restrain the covering (the carpet 30) from protruding upward by a prescribed amount or more.

The object drop preventing material (the object drop preventing material 40) includes a flexible planar member. With the configuration, the movement of the covering (the carpet 30) bending along with the movement of the seatback (the seatback 10) is hardly obstructed by the object drop preventing material (the object drop preventing material 40). Further, even if the object drop preventing material (the object drop preventing material 40) bends along with the movement of the covering (the carpet 30), the object drop preventing material (the object drop preventing material 40) is hardly twisted laterally, and the orientation of the object drop preventing material (the object drop preventing material 40) is hardly changed. Thus, both the object drop preventing material (the object drop preventing material 40) and the covering (the carpet 30) can function appropriately.

Further, the covering (the carpet 30) and the object drop preventing material (the object drop preventing material 40) are connected (sewn) to each other so as to form a continuous planar shape. With the configuration, an effect of restraining upward protruding of the covering (the carpet 30) can be appropriately obtained over a wide area in the width direction.

The embodiment of the disclosure has been described above, but the disclosure can be implemented in various embodiments other than the above embodiment. For example, the vehicle seat of the disclosure is widely applicable to seats provided in a vehicle other than the automobile, such as a train, and other vehicles such as an aircraft and a vessel, in addition to the rear seat of the automobile.

Further, the covering is not limited to the carpet shown in the above embodiment, and any of various planar materials having flexibility, such as various fabric materials and leather materials, may be employed as the covering. Further, the part to which the covering is attached is not limited to the back surface of the seatback, and the covering may be attached to a part other than the back surface of the seatback. For example, the covering may be attached to a bottom surface of the seatback. Further, the part to which the covering is attached is not limited to the deck panel positioned in the location under the front end part of the deck board, as shown in the embodiment, and may be attached to a location other than the location under the front end part of the deck board. For example, the covering may be attached to a location on the deck board.

Further, the seatback is not limited to a seatback that is tiltable in the front-rear direction relative to the seat cushion, and may be provided to be tiltable in the front-rear direction relative to a vehicle body such as a floor. Further, when the seatback is tilted forward, the seat cushion may sink toward a front-lower side and the seatback may be tilted forward to a top surface portion of the seat cushion. That is, the seatback may be tilted forward with the use of so-called tilt-down movement.

Further, similarly, the object drop preventing material is not limited to the non-woven fabric, and any of various planar materials having flexibility, such as various fabric materials, leather materials, and mesh net materials, may be employed as the object drop preventing material. Further, the object drop preventing material does not necessarily need to be attached to the covering by sewing. The object drop preventing material may be attached to the covering with the use of various attachment means. For example, the object drop preventing material may be attached to the covering with the use of an adhesive agent, an adhesive compound, a line fastener, a hook and loop fastener, or a stopper such as a clip. Further, the object drop preventing material may be attached to the covering at some parts with the use of a line material such as a string such that the object drop preventing material is in a suspended state.

What is claimed is:

1. A vehicle seat comprising:
   a seat cushion;
   a seatback configured to be tiltable in a front-rear direction;
   a deck board positioned behind the seatback;
   a covering having flexibility and provided to extend from the seatback to the deck board; and
   an object drop preventing material that covers, from a back side, a gap between the seatback and the seat cushion, wherein
   the object drop preventing material is provided to extend from the seat cushion to an intermediate part of the covering in a length direction of the covering and is attached to the covering such that the object drop preventing material restricts an amount of upward bending of the covering.

2. The vehicle seat according to claim 1, wherein the object drop preventing material includes a flexible planar member.

3. The vehicle seat according to claim 1, wherein the covering and the object drop preventing material attached to each other form a continuous planar shape.

\* \* \* \* \*